United States Patent [19]

Singh et al.

[11] Patent Number: 5,805,809
[45] Date of Patent: Sep. 8, 1998

[54] INSTALLABLE PERFORMANCE ACCELERATOR FOR MAINTAINING A LOCAL CACHE STORING DATA RESIDING ON A SERVER COMPUTER

[75] Inventors: Jagdeep Singh, Cupertino; Boen T. Thio, Escondido; Chandrashekhar W. Bhide; Wayne R. Gray, both of Sunnyvale, all of Calif.

[73] Assignee: Shiva Corporation, Bedford, Mass.

[21] Appl. No.: 427,966

[22] Filed: Apr. 26, 1995

[51] Int. Cl.[6] .............................. G06F 13/00; G06F 15/16
[52] U.S. Cl. ................. 395/200.33; 395/200.47; 395/200.49; 395/800.3; 395/445
[58] Field of Search .......................... 395/200.03, 200.06, 395/200.07, 200.08, 200.09, 200.13, 800, 403, 445, 467, 468, 725, 676, 332

[56] References Cited

U.S. PATENT DOCUMENTS

| | | | |
|---|---|---|---|
| 4,941,084 | 7/1990 | Terada et al. | 395/674 |
| 5,046,027 | 9/1991 | Taaffe et al. | 395/153 |
| 5,109,515 | 4/1992 | Laggis et al. | 395/725 |
| 5,218,699 | 6/1993 | Brandle et al. | 395/650 |
| 5,222,224 | 6/1993 | Flynn et al. | 395/471 |
| 5,224,095 | 6/1993 | Woest et al. | 370/85.8 |
| 5,287,504 | 2/1994 | Carpenter et al. | 395/600 |
| 5,321,816 | 6/1994 | Rogan et al. | 395/242 |
| 5,452,447 | 9/1995 | Nelson et al. | 395/621 |
| 5,453,979 | 9/1995 | Schibler et al. | 370/60.1 |
| 5,491,780 | 2/1996 | Fyles et al. | 395/332 |
| 5,493,667 | 2/1996 | Huck et al. | 395/452 |
| 5,497,463 | 3/1996 | Stein et al. | 395/200.03 |

FOREIGN PATENT DOCUMENTS

WO 93/19420  9/1993  WIPO.

OTHER PUBLICATIONS

IBM Technical Disclosure Bulletin, vol. 33, No. 12, May 1991; "Virtual Communication Subsystem"; pp. 279–284.
"Robert Van Renesse et al"; The Design of a high–performance File Server, 1989 IEEE pp. 22–27.
M. Satyanarayanan, A Survey of Distributed File Systems, *Annual Review of Computer Science*, V. 4, Feb. 1989, pp. 1–26.

*Primary Examiner*—Meng-Ai T. An
*Attorney, Agent, or Firm*—Townsend and Townsend and Crew LLP

[57] ABSTRACT

An installable performance accelerator for computer network distributed file systems is provided. A cache subsystem is added onto, or plugged into, an existing distributed file system with no source code modifications to the operating system. The cache subsystem manages a cache on the client computer side which traps file system calls to cached files in order to obtain an immediate and substantial performance increase in distributed file system performance.

15 Claims, 14 Drawing Sheets

INSTALLABLE PERFORMANCE ACCELERATOR FOR MAINTAINING A LOCAL CACHE STORING DATA RESIDING ON A SERVER COMPUTER

BACKGROUND OF THE INVENTION

The present invention is related to computer networks and, more particularly, to a performance accelerator providing file caching and other techniques to accelerate network computers.

A large portion of the tremendous increase in performance seen in the microprocessor world over the last fifteen years can be attributed to better management of the microprocessor memory hierarchy. In particular, the technique known as caching alone is responsible for a large part of the performance improvement. In a common memory cache, recently accessed data from the relatively slow main memory of dynamic random access memory (DRAM) is stored in a cache of relatively fast static random access memory (SRAM). Performance increases are achieved when requested data is retrieved from the cache instead of the main memory.

Another form of caching involves storing recently accessed data from hard disks in main memory. Because the access speed of main memory is significantly faster than a hard disk access, disk caching provides substantial performance increases. A common disk caching program is Smart-Drive that is included in Microsoft Windows.

In the late 1980's, network designers also realized the benefits of caching and began to apply some of these techniques to this new domain in the form of network caching. Networks typically include a distributed file system which allows multiple computer systems to share data or files. The computer system that stores a file locally is called the server with client computer systems making requests to the server to remotely access the file. In network caching, a client computer system stores network data or files locally on a hard disk. Distributed file systems like AFS and CODA (both developed at Carnegie-Mellon University), Sprite (developed at the University of California, Berkeley), and several others include some form of network caching to produce better performing and more robust distributed file systems.

FIG. 1 illustrates a common microprocessor and data storage hierarchy. A central processing unit (CPU) 10 performs the operations of the computer using data stored in one of the storage media shown below the CPU. The storage media include a cache 12, main memory 14, hard disk 16, and network 18. The cache is a form of high speed memory that provides the quickest access time. Access times steadily decrease to the network which typically provides the slowest access time. A memory cache 20 involves storing data from the main memory in the cache. Similarly, a disk cache 22 (e.g., SmartDrive) involves storing data from the disk in main memory. Lastly, a network cache 24 involves storing data from the network on the hard disk.

The present invention is directed generally to improving network caching capabilities in computer networks. However, the above description does not imply that the different forms of caching operate individually. To the contrary, the different forms of caching typically operate together. For example, a file on the network may be cached on a local hard disk that is disk cached in main memory.

The fundamental idea behind caching, in both the memory, hard disk, and network worlds, is to keep a copy of recently accessed data in a faster storage area (the "cache") so that subsequent accesses to the same data proceed at a faster rate. Caching in a distributed file system involves having the client computer system store locally a copy of the data or file that resides on the server. The concept of locality of reference states that there is a high probability that data will be reused soon after its first use. By obtaining a local copy of the data or file, a client computer system can avoid many further interactions with the server.

References within a file typically exhibit spatial locality meaning that if a block of a file is read, there is high probability that succeeding blocks will also be read. A client computer system can take advantage of spatial locality by caching the entire file or by requesting successive blocks of a file while a block is being processed. By taking advantage of both locality of reference and spatial locality, caching results in much faster overall performance for the client computer system.

However, prior art cache systems for distributed file systems are inherently a part of the server operating system. For example, AFS, CODA, and Sprite are all "built" or "compiled" into the UNIX kernel. Thus, to obtain the benefits of these systems, one needs to install the entire operating system on at least the server side and generally also on the client side of the distributed file system. However, installing a new operating on both the client and server sides is not generally feasible in a commercial setting because the process is very time consuming and existing applications may be incompatible with the new operating system.

Prior art cache systems are built into the operating system for a number of reasons including the following:

(a) It is difficult to maintain cache coherency between the client and server computer systems if the cache system is not a part of the server operating system. This is because the server needs to let the client know what data has been modified to maintain cache coherency, but if the cache system is not a part of the operating system, the operating system generally does not know data has been modified.

(b) The cache system is such an integral part of the file system (which is part of the operating system) that it is much easier to design them in conjunction.

(c) The programmers working on cached distributed file systems have typically been in academic rather than commercial environments, where they have had full access to the source code of the operating system and thus have no reservations about modifying the source code to suit their needs.

What is needed is a performance accelerator that provides file caching for distributed file systems without requiring modification of the server distributed file system or operating system. The present invention fulfills this and other needs.

SUMMARY OF THE INVENTION

The present invention provides an innovative approach to caching for distributed file systems which allows the cache subsystem to be added onto, or plugged into, an existing distributed file system with no source code modifications to the operating system. With the present invention the source code of the server operating system does not need to be modified or even analyzed to get a substantial performance increase on the client computer system. Additionally, the server is not required to trap file system calls. For example, a client user of DOS or Windows, running under a distributed file system such as Novell NetWare, Banyan Vines, Microsoft LAN Manager, or any other distributed file system can install the cache subsystem of the present invention into their computer and obtain an immediate and substantial performance increase.

In an embodiment of the present invention, a method of accelerating performance of a client computer comprises the steps of: an application on the client computer issuing a system call; trapping the system call on the client computer before the system call is sent over a network link; an accelerator subsystem on the client computer determining if the system call is capable of being serviced locally utilizing a cache on the client computer, the accelerator subsystem being separate from an operating system of the client computer; servicing the system call on the client computer if the system call is serviceable locally; and sending the system call to a server computer if the system call is not serviceable locally.

One aspect of the present invention allows a cache subsystem to be installed on a client computer to trap file system calls and server them locally with a cache. Another aspect of the present invention is a performance accelerator that traps both file and non-file system calls on the client computer to server the calls locally. Yet another aspect of the present invention accelerates the transmission of system calls to the server side over a low bandwidth link.

Other features and advantages of the present invention will become apparent upon a perusal of the remaining portions of the specification and drawings.

DESCRIPTION OF THE PREFERRED EMBODIMENT

Definitions uncached blocks—Blocks that have never been fetched. All blocks start out uncached.

valid blocks—Blocks that have been fetched and are known to be valid (i.e., the information in the blocks is known to be consistent with the server).

invalid blocks—Blocks that have been fetched before but have been marked invalid because the information in the blocks may not be valid. Invalid blocks can be validated by checking with the server whether the information in the blocks is correct, typically by comparing checksums of the cached blocks and the current blocks on the server.

discarded blocks—Blocks that have been fetched but are known to be inconsistent with the server and therefore will need to be refetched (i.e., the blocks cannot be validated like invalid blocks). Discarded blocks are generally treated like uncached blocks.

deny-write mode—One of the file open sharing modes which prevents the file from being written to by another including compatibility, deny-all, and deny-write.

allow-write mode—One of the file open sharing modes which allows the file to be written to by another including deny-read and deny-none.

Description

In the description that follows, the present invention will be described in reference to IBM personal computer systems running DOS/Windows and Novell NetWare as the operating system and network operating system, respectively. The present invention, however, is not limited to any particular environment or any particular application. Instead, those skilled in the art will find that the system and methods of the present invention may be advantageously applied to a variety of systems, including different platforms and environments. Therefore, the description the embodiments that follow is for purposes of illustration and not limitation.

Figure 1:
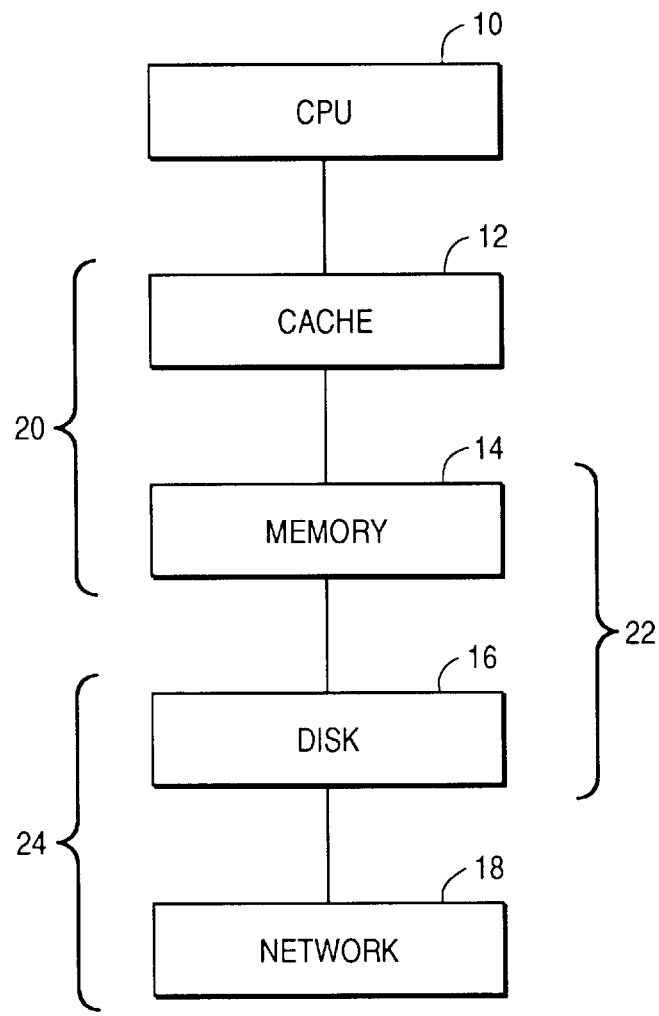
FIG. 1 illustrates a common microprocessor and data storage hierarchy.
Figure 2:
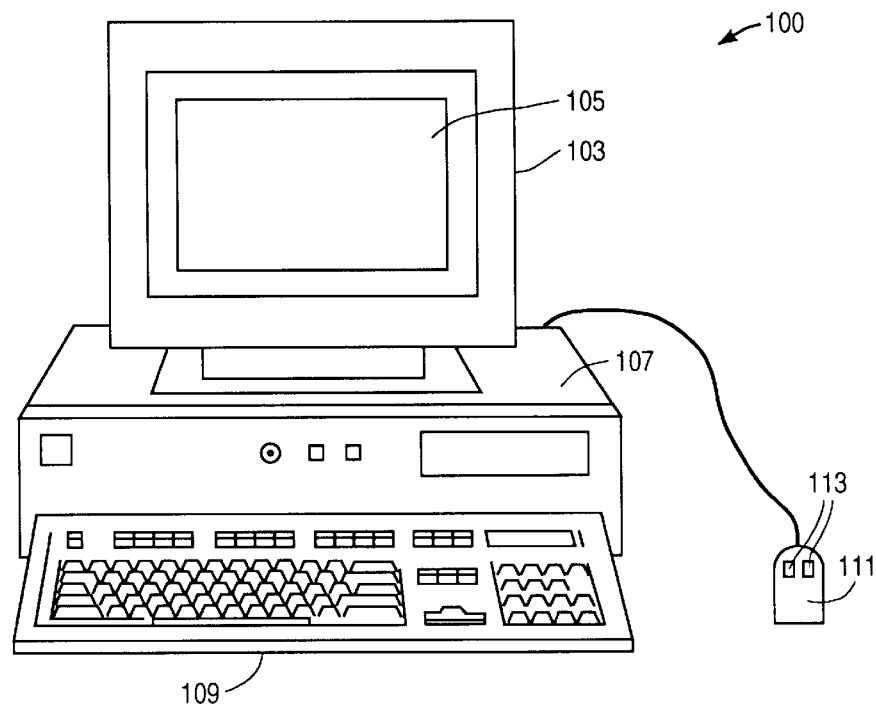
FIG. 2 illustrates an example of a computer system used to execute the software of the present invention.

FIG. 2 illustrates an example of a computer system used to execute the software of the present invention. FIG. 2 shows a computer system 100 which includes a monitor 103, screen 105, cabinet 107, keyboard 109, and mouse 111. Mouse 111 may have one or more buttons such as mouse buttons 113. Cabinet 107 houses familiar computer components (not shown) such as a processor, memory, disk drives, and the like.

Figure 3:
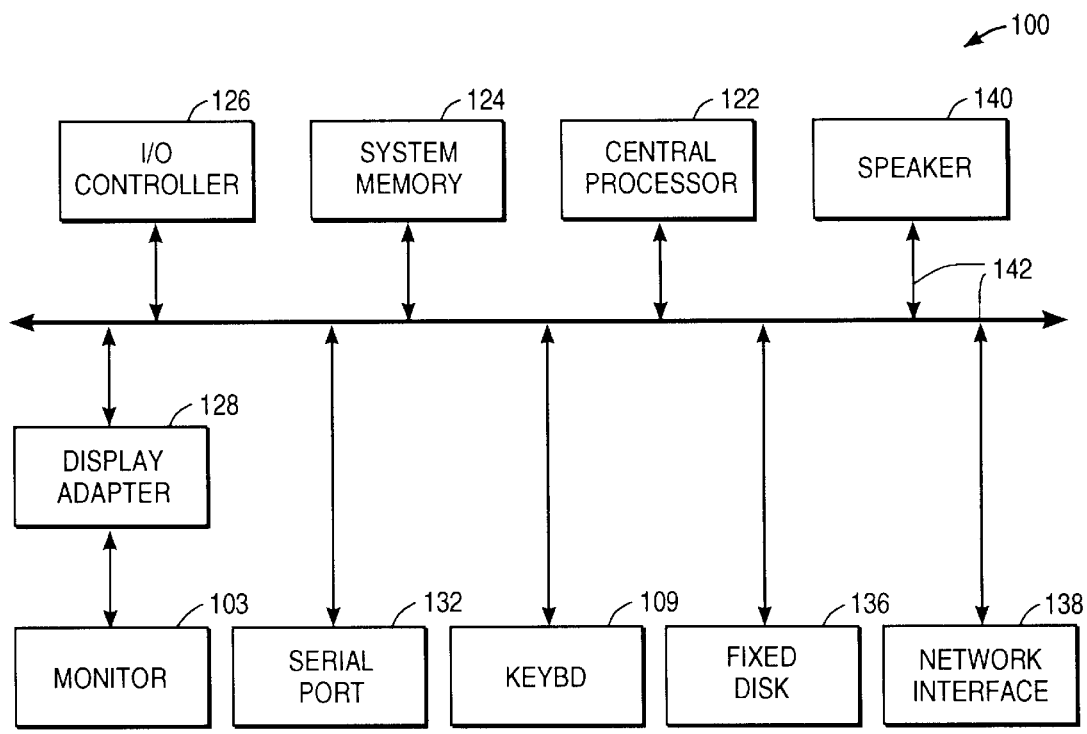
FIG. 3 shows a system block diagram of a typical computer system used to execute the software of the present invention.

FIG. 3 shows a system block diagram of computer system 100 used to execute the software of the present invention. As in FIG. 2, computer system 100 includes monitor 103 and keyboard 109. Computer system 100 further includes subsystems such as a central processor 122, system memory 124, I/O controller 126, display adapter 128, serial port 132, fixed disk 136, network interface 138, and speaker 140. Other computer systems suitable for use with the present invention may include additional or fewer subsystems. For example, another computer system could include more than one processor 122 (i.e., a multi-processor system) or a system may include a cache memory.

Arrows such as 142 represent the system bus architecture of computer system 100. However, these arrows are illustrative of any interconnection scheme serving to link the subsystems. For example, speaker 140 could be connected to the other subsystems through a port or have an internal direct connection to central processor 122. Computer system 100 shown in FIG. 3 is but an example of a computer system suitable for use with the present invention. Other configurations of subsystems suitable for use with the present invention will be readily apparent to one of ordinary skill in the art.

Figure 4:
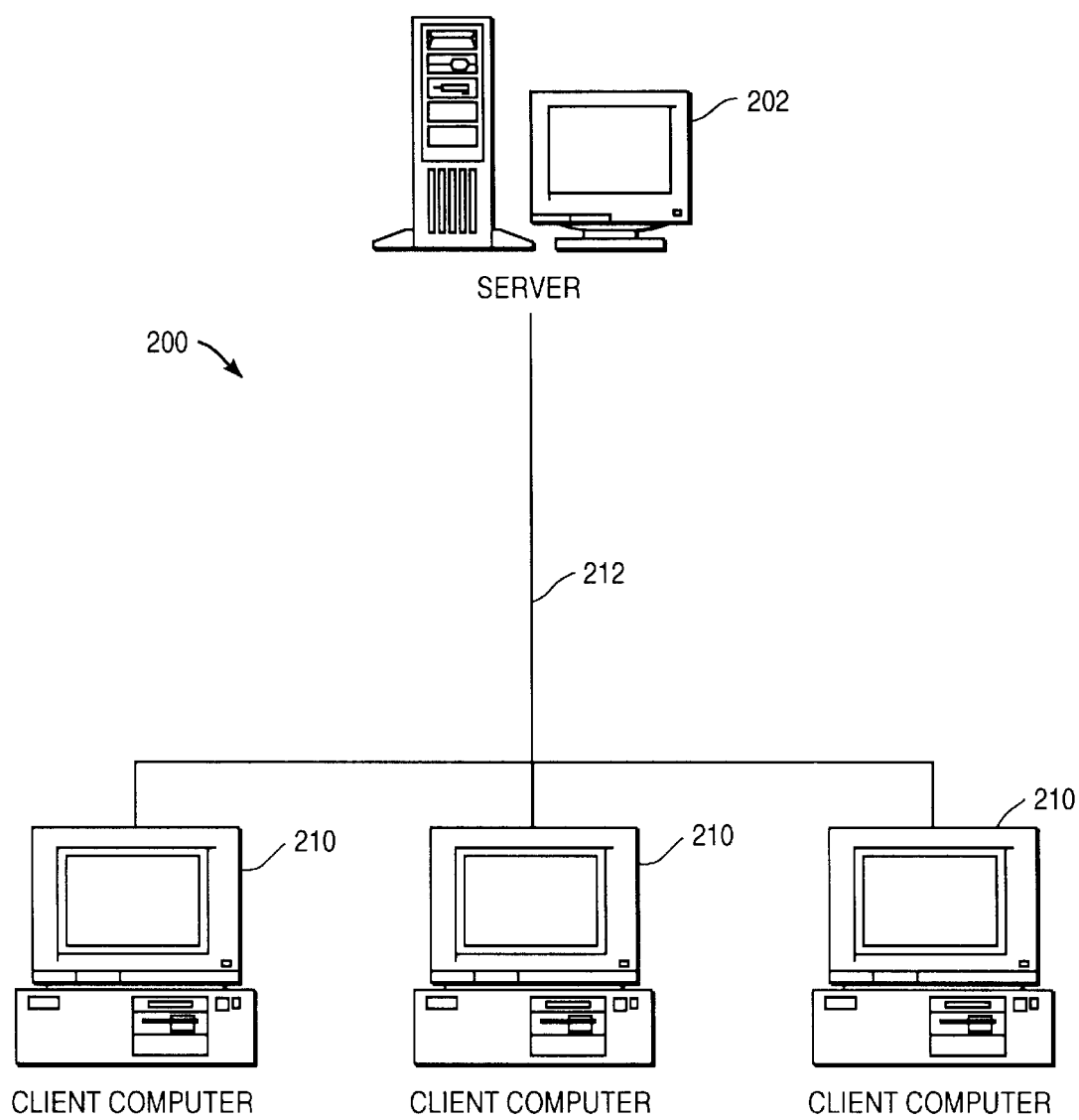
FIG. 4 shows a network diagram of a typical distributed file system.

FIG. 4 shows a network diagram of a typical distributed file system. A distributed file system 200 includes a server 202. The server is typically a relatively high speed data processor that includes a large storage space for data or files that will be requested by client systems. The server is electrically connected to client computers 210 by a local area network (LAN) 212. The server and client computers communicate and exchange data or files over LAN. Although FIG. 4 illustrates a typical distributed file system, the present invention may be utilized on any server/client computer environment.

Figure 5:
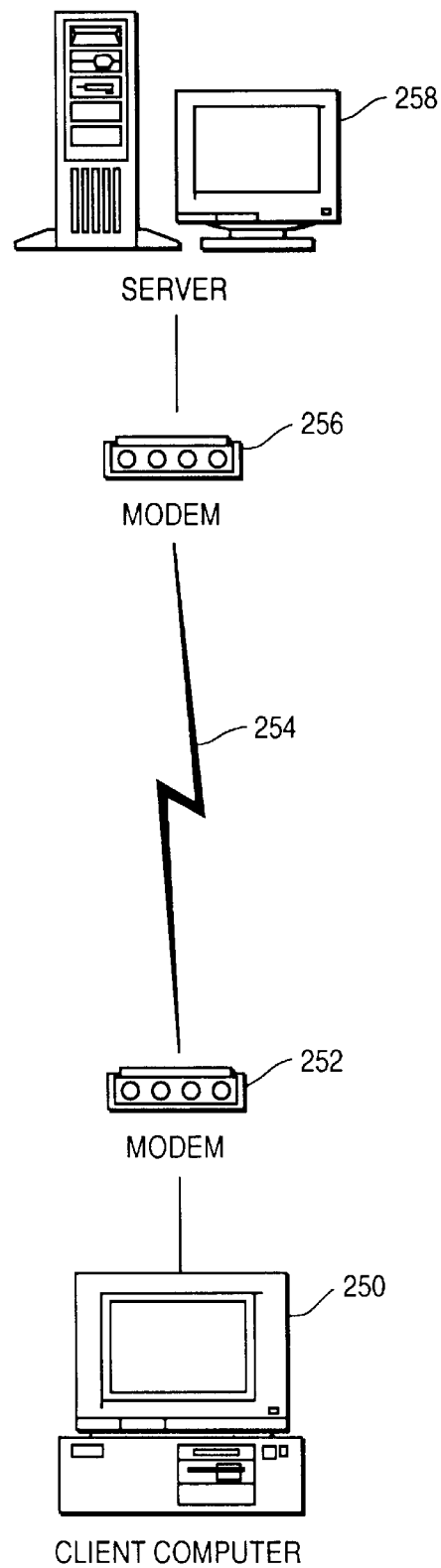
FIG. 5 shows remote access to a server by a client computer system.

FIG. 5 shows remote access to a server by a client computer system. A client computer 250 is connected to a modem 252. Modem 252 communicates over a telephone line 254 to a modem 256, which is electrically connected to a server 258. The client computer is able to remotely accesses data or files on the server through the modem link. However, these accesses are significantly slower than local accesses because of the low bandwidth link of telephone line 254. Thus, a user of a client computer will notice a dramatic decrease in performance when accessing data on the server. Although the client computer is shown remotely accessing a single server computer, the client computer may also remotely access a LAN including a server.

Figure 6:
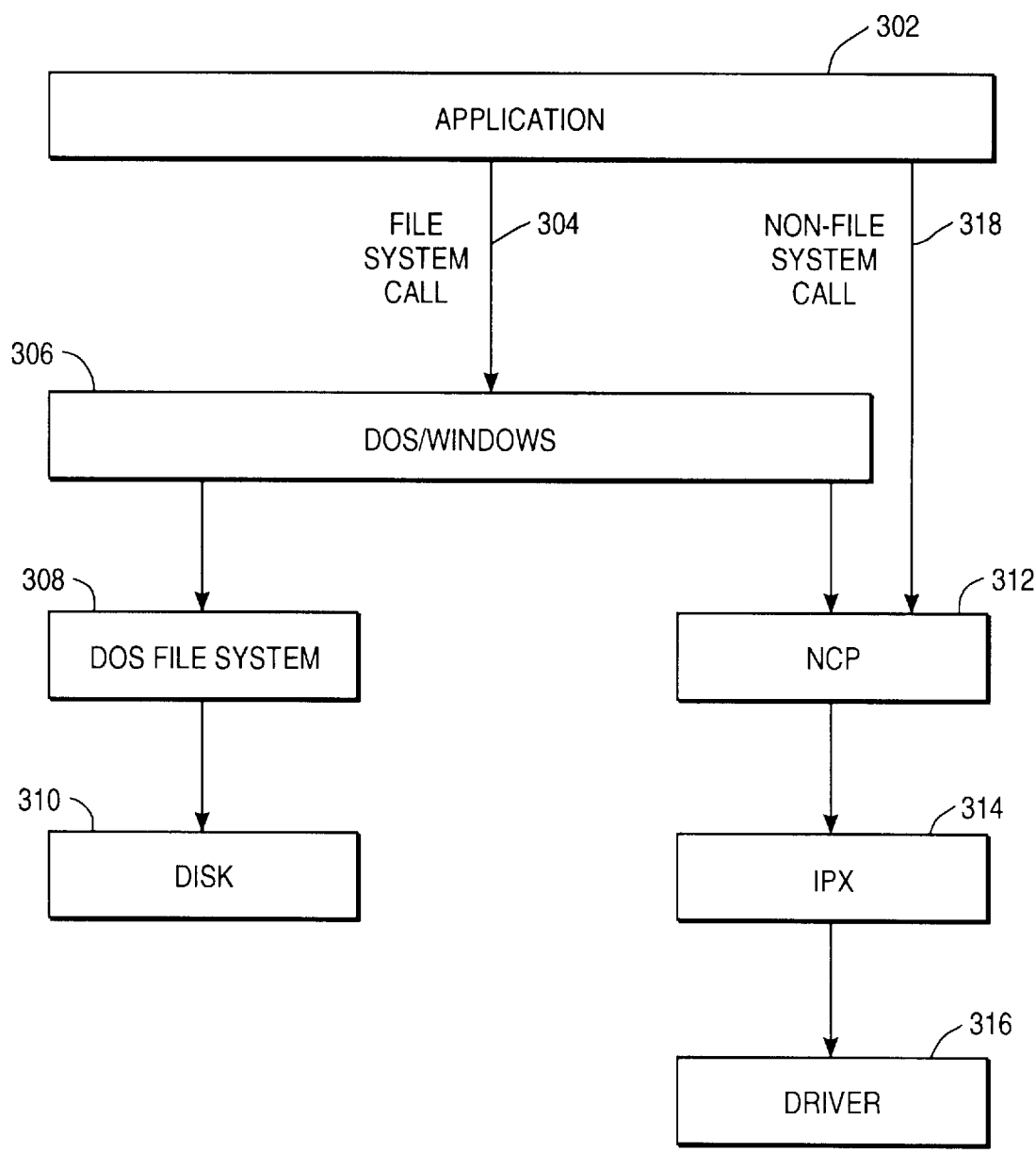
FIG. 6 shows the software hierarchy on a typical client computer in a distributed file system.

FIG. 6 shows the software hierarchy on a typical client computer in a distributed file system. At the highest level, a user is interacting with an application 302. The application accesses files by making a file system call 304 to the operating system 306. The operating system determines whether the file system call references a local or remote file. If the file system call references a local file, the operating system makes a file system call to the local file system 308. The local file system then accesses a local disk drive 310 to fulfill the file system call. Although the local disk drive is not software, it is shown to aid the reader in understanding the software hierarchy.

If the file system call references a remote file (i.e., one located on the server), the operating system makes a file system call to a network protocol 312. In the Novell Netware environment, the network protocol is called the NetWare Core Protocol (NCP). The network protocol makes a request to a network board-specific protocol 314. In the Novell NetWare environment, the network board-specific protocol may be the Internetwork Packet Exchange (IPX), Sequenced Packet Exchange (SPX), Transmission Control Protocol/ Internet Protocol (TCP/IP), and the like. The network board-specific protocol then makes a request to a network driver 316. The network driver is the software that controls the transmission and receipt of information over the network hardware between the server and client computer.

Additionally, the application communicates over the network by making a non-file system call 318 to the network protocol. A non-file system call bypasses operating system 306 and interacts directly with the network protocol. The non-file system calls may be calls to network Application Programming Interfaces (APIS) like WinSock, NetBIOS, NetWare Sockets, and the like. Therefore, a performance accelerator for a networked computer will preferably address both file and non-file system calls.

Figure 7:
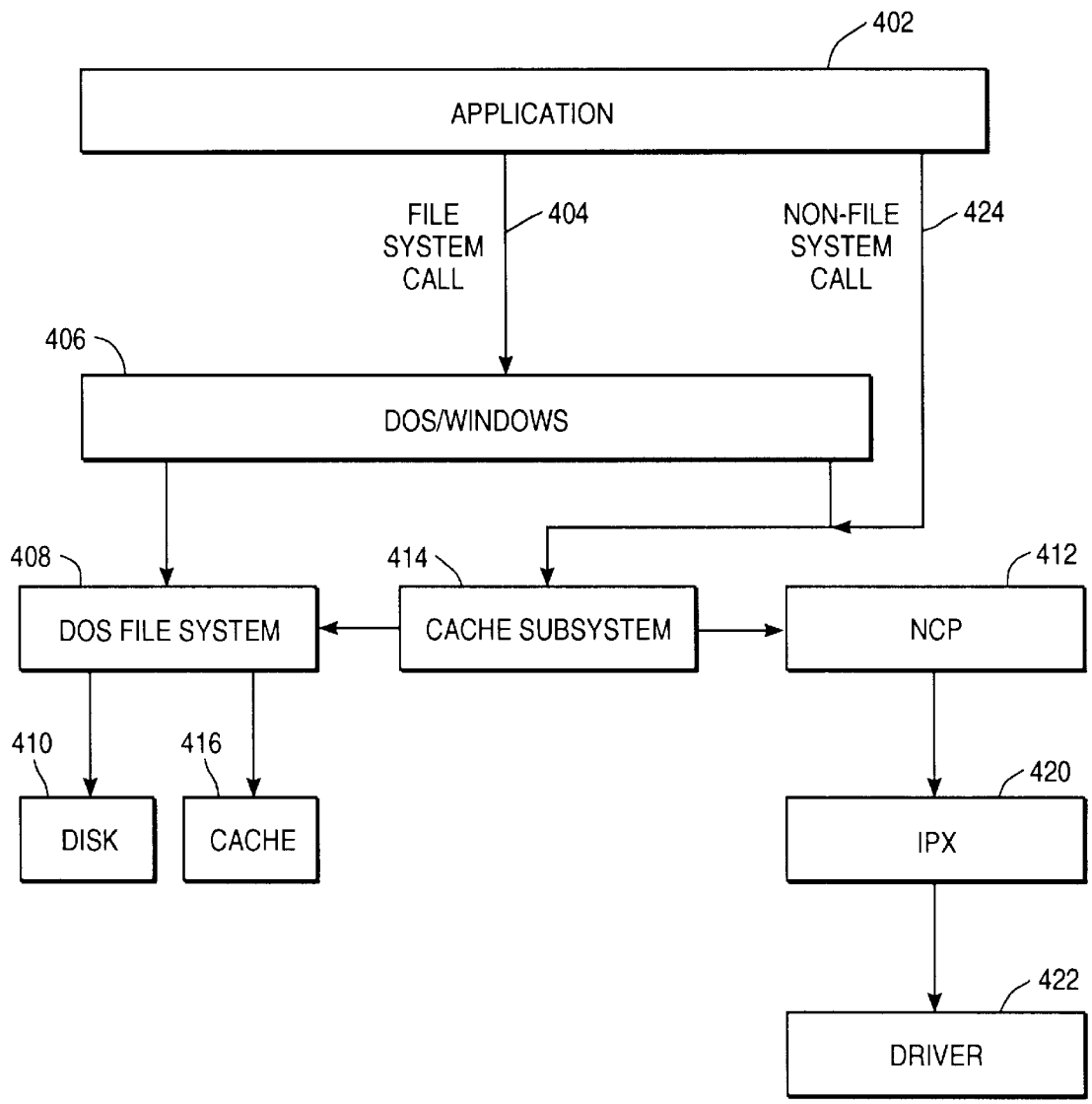
FIG. 7 shows the software hierarchy on a client computer according to the present invention.

FIG. 7 shows the software hierarchy on a client computer according to the present invention. At the highest level, a user is interacting with an application 402. The application accesses files by making a file system call 404 to the operating system 406. The operating system determines whether the file system call references a local or remote file. If the file system call references a local file, the operating system makes a file system call to the local file system 408. The local file system then accesses a local disk drive 410 to fulfill the file system call.

If the file system call references a remote file (i.e., one located on the server), the operating system makes a file system call to the network protocol 412. However, in the present invention, a cache subsystem 414 traps the call to the network protocol thereby intercepting the call before it gets to the network protocol. Trapping is a standard operating system mechanism that is implemented according to the appropriate operating system. For example, under DOS and Windows, the mechanism is the redirector interface. The mechanism is the Virtual file System (VFS) interface under UNIX and the Installable File System (IFS) interface under Windows 95, Windows NT and OS/2. These mechanisms are well documented and readily available.

The cache subsystem is software that maintains information that allows remote files or blocks to be cached on the local file system. When data in the form of a file or block of a file is received from the server, the data is stored in a local cache 416. The cache is shown separate from the local disk drive but will typically be a portion of the local disk drive. When cache subsystem 414 traps a request meant for the network protocol, the cache subsystem analyzes the request and determines if the request may be satisfied by accessing data stored locally in the cache. Satisfying the request by accessing the local cache provides a significant increase in client computer performance. The present invention accomplishes this without modifying the operating system or requiring the server to trap system calls.

In a preferred embodiment, the cache subsystem traps file system calls using the DOS redirector interface. Initially, the NETWORK bit of the Current Directory Structure (CDS) for the hard drive to be accelerated by the cache is set. The CDS is an internal data structure DOS maintains about each drive letter. If the NETWORK bit of the CDS is set, DOS passes all file system calls on that drive to the cache subsystem instead of the network protocol. This enables the cache subsystem to trap file system calls that would be ultimately processed by the server.

If cache subsystem 414 determines that the data requested by the file system call is not stored locally in the cache or the data in the cache is stale, the cache subsystem sends the system file call to the network protocol so that the data can be accessed from the server. In order to send the system call to the network protocol, the NETWORK bit of the appropriate CDS is returned to the state it was before it was set by the cache subsystem and a bit in global memory is set to indicate that the next file system call should be allowed to chain on to the next interrupt handler, the network protocol. Setting the NETWORK bit to its original state is preferable because the bit may have been off (not set) so that the client computer could intercept file system calls (i.e., interrupt 21H in DOS) before they go through DOS. Alternatively, the NETWORK bit may have been on (set) so that the file system calls on the client computer system would go through DOS. Also, the bit in global memory should be set because otherwise the cache subsystem of the present invention would receive the file system call again.

Once the file system call is received by network protocol 412, the network protocol makes a request to a network board-specific protocol 420. The network board-specific protocol then makes a request to a network driver 422, which is the software that controls the transmission and receipt of information over the network hardware between the server and client computer. The request is sent to the server via the network hardware so that the server can access the requested data and send it back to the client computer over the network.

Additionally, the application communicates over the network by making a non-file system call 424 to the network protocol. A non-file system call bypasses operating system 406 and interacts directly with the network protocol. The non-file system calls may be calls to network Application Programming Interfaces (APIs) like WinSock, NetBIOS, NetWare Sockets, and the like. Since the non-file system calls bypass the file system, a different mechanism is utilized to trap non-file system calls. Under Microsoft Windows, the present invention traps non-file system calls by replacing an application's standard Dynamic Linked Library (DLL) with a DLL that allows the present invention to trap non-file system calls. Thus, non-file system calls may be trapped and accelerated without making modifications to the application; the application continues to write to the APIs it always writes to and the present invention traps those API calls and sends them to the server (or proxy-server described later) using its optimized protocol.

The present invention can provide client side caching on either a block basis or a whole-file basis. In a preferred embodiment, the type of caching is user selectable. The following description will focus on block caching; however, the same concepts apply to whole-file caching as it is conceptually a special case of block caching where the block size is very large.

Figure 8:
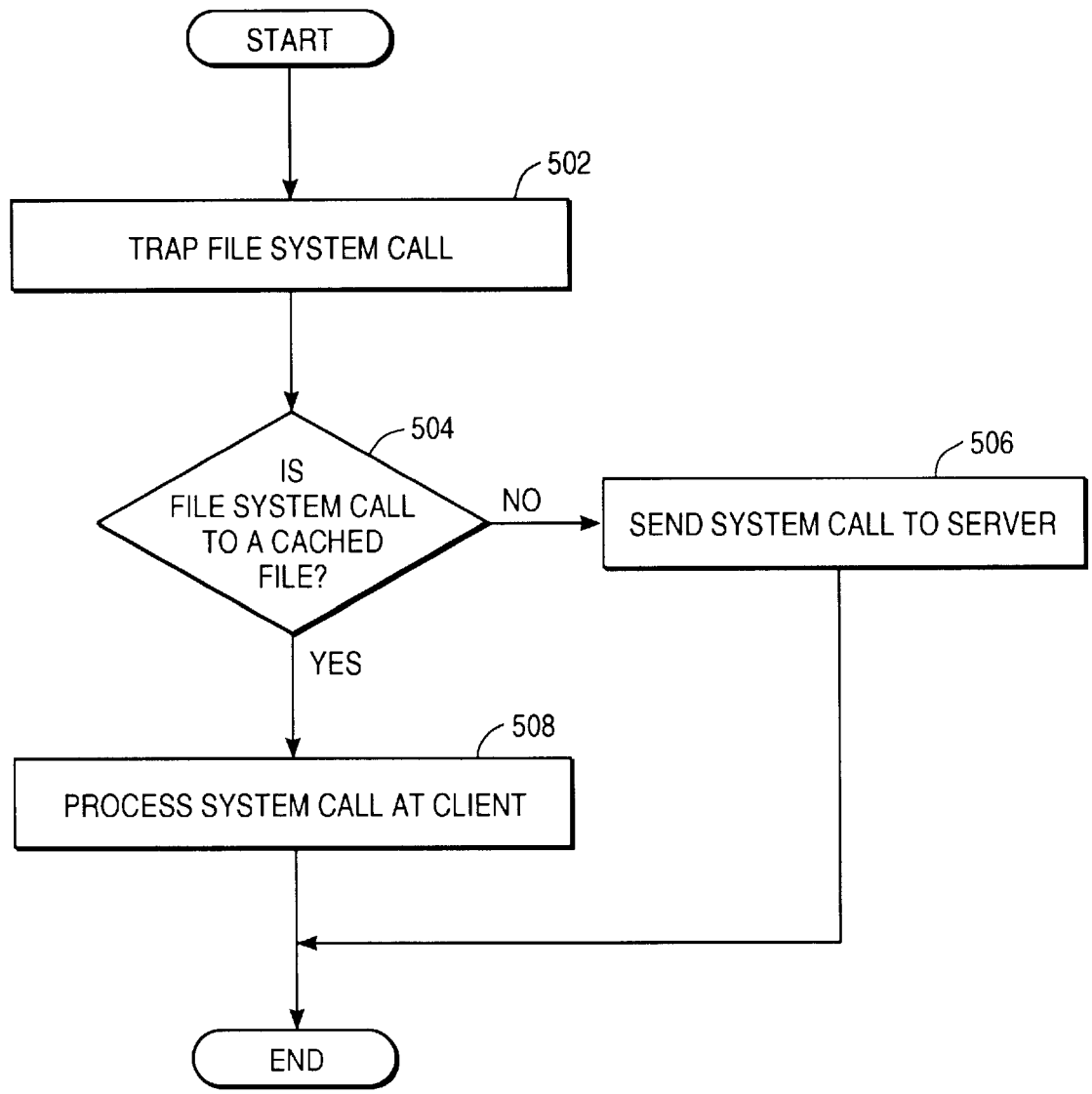
FIG. 8 illustrates a high level flowchart of the operation of the cache subsystem.

FIG. 8 illustrates a high level flowchart of the operation of the cache subsystem. At step 502, the cache subsystem traps a file system call that specifies a file on the server. The cache subsystem then determines if the file system call can be serviced locally (e.g., the file system call specifies a file that is cached or will be cached for a file open) on the client computer at step 504. If the file system call cannot be serviced locally, the cache subsystem sends the file system call to the server via the network as described above. The file system call is sent to the server at step 506. In a preferred embodiment, the NETWORK bit of the appropriate CDS is returned to the state it was before it was set by the cache subsystem and a bit in global memory is set to indicate that the next file system call should be allowed to chain on to the next interrupt handler, the network protocol.

If the file system call can be serviced locally (e.g., specifies a file that is cached), the cache subsystem will process the file system call on the client side with little or no interaction with the server. The cache subsystem process the file system call at step 508. Since the file system call may specify many different kinds of operations on the cached file, the steps involved for each operation will be discussed in reference to the remaining figures.

The cache subsystem maintains two local files that contain information about a cached file. In a preferred embodiment, one file has a ".FCD" extension and the other has a ".FCI" extension. The FCD file contains all the cached blocks for the particular file. The FCI file contains information about the file on the server and index information into the FCD file.

The FCI file has a file header which contains the following information:
Mode —mode in which the file was opened
Size —size of the file on the server
lMod —last modification time on the server
lRefetch —last time a cached block was fetched from the server
Whole —flag indicating if the whole file has been fetched from the server
Seq —flag indicating if the file has been accessed sequentially
Next —next cached block to be accessed if file is sequentially accessed The FCI file also information about the blocks that have been cached. For each cached block in the FCD file, there is an associated plain block in the FCI file which contains the following information:
Offset —offset in the FCD file where the block is cached
lModBlock —time the cached block was fetched from the server In a preferred embodiment, the FCI file also contains base blocks which provide an indexing function for the plain blocks and therefore, the cached blocks in the FCD file. The base blocks have levels associated with them. Each base block of level 1 or greater contains four offsets within the FCI file of a base block of lower level. Each base block of level 0 contains four offsets within the FCI file pointing to plain blocks which reference cached blocks in the FCD file. Cached blocks are added, updated, or searched using a variation of a binary search protocol starting at the top level of base blocks in the FCI file and descending down until level 0 is reached. The base block at level 0 references a plain block that is used to access or update data in the cached block in the FCD file.

Figure 9:
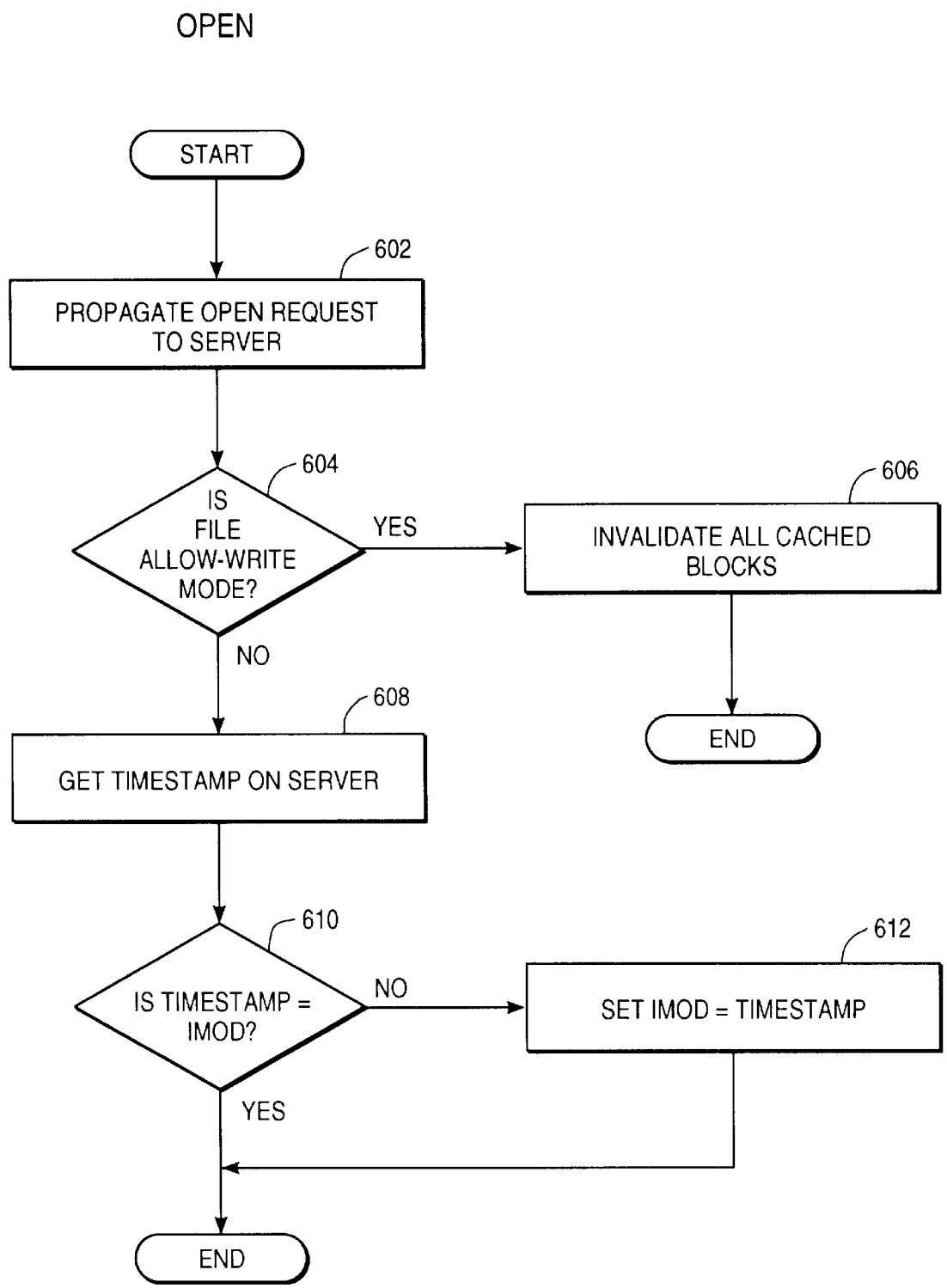
FIG. 9 illustrates a flowchart of a file system call that opens a file.

FIG. 9 illustrates a flowchart of a file system call that opens a file. Distributed file systems typically include different share permissions to coordinate access to shared files. For DOS/Windows, these permissions may include compatibility, deny-all, deny-write, deny-read, and deny-none. At step 602, the cache system propagates the file open request to the server. The share permission specified in the file system call is propagated to the server.

At step 604, the cache subsystem determines whether the file is opened in allow-write mode. If the file is opened in allow-write mode, the cache subsystem invalidates all the cached blocks for the file at step 606. Otherwise, the cache subsystem requests the timestamp of the file on the server at step 608. Once the timestamp of the file is received, the timestamp is compared to the variable iMod in the FCI file at step 610. If lMod is not equal to the timestamp, lMod is set equal to the timestamp at step 61208.

Figure 10A:
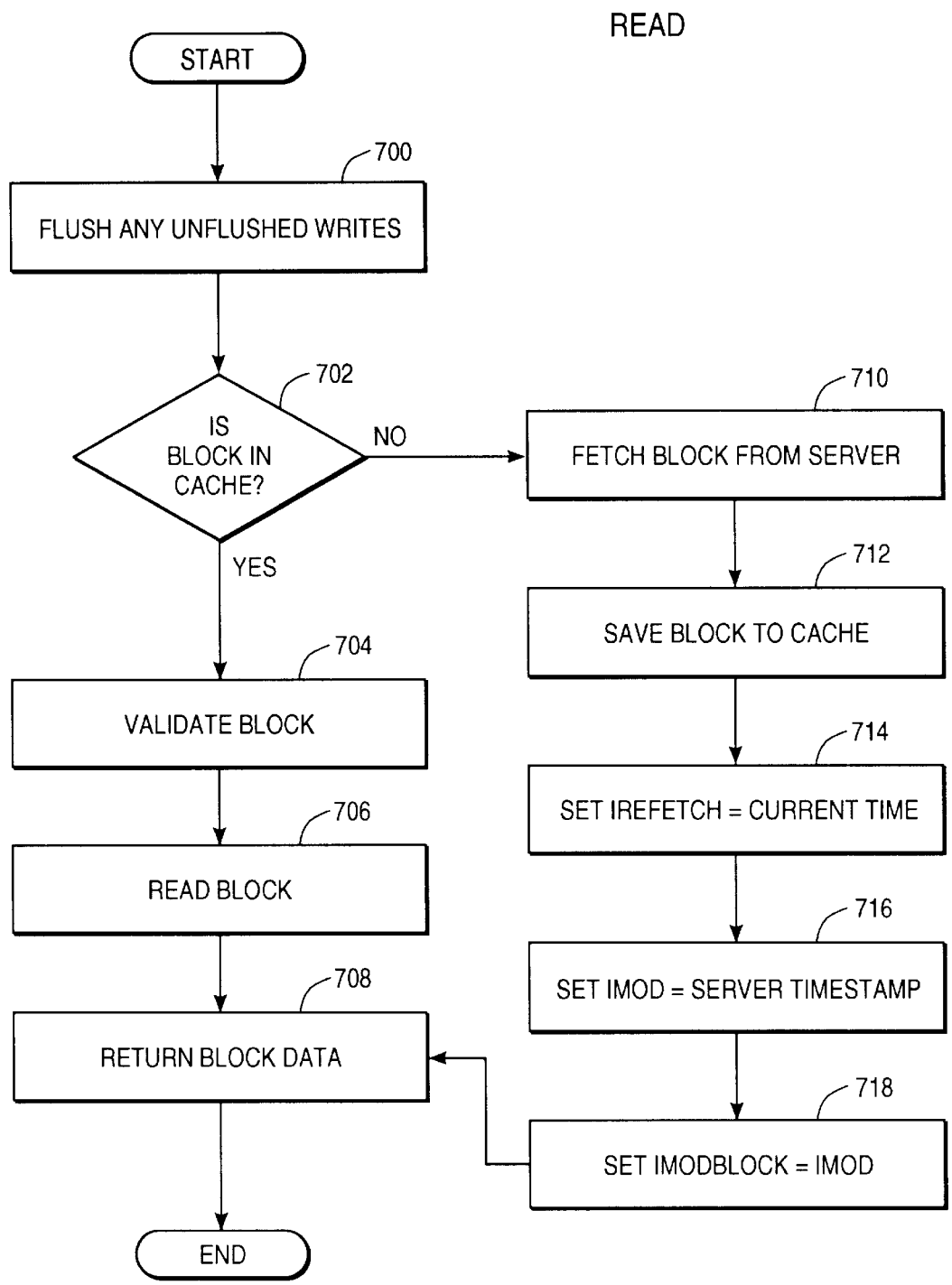
FIG. 10A illustrates a flowchart of a file system call that reads a block of a cached file.

FIG. 10A illustrates a flowchart of a file system call that reads a block of a cached file. The cache subsystem flushes any unflushed writes to the block at step 700. At step 702, the cache subsystem determines if the requested block is in the cache. If so, the cache subsystem validates the data in the cached block at step 704. The validation process will be described in more detail in reference to FIG. 10B. However, if the data in the cached block is known to be valid then the cache subsystem does not need to validate the block. Once the cached block is validated, the cached block is read from the FCD file at step 706. The data from the cached block is returned to the requesting application at step 708.

If the cache subsystem determines that the requested block is not in the cache, the cache subsystem fetches the block from the server at step 710. A block is fetched from the server by issuing a file system call to the network protocol to retrieve the block. In addition to the block, the cache subsystem receives other information including the timestamp of the file on the server. After the block is received by the cache subsystem, the block is saved to the cache at step 712. Whenever a block is fetched from the server, the variable iRefetch is set to the current time as in step 714. At step 716, lMod is set equal to the timestamp of the file on the server. The variable lModBlock in the associated plain block of the FCI file is set equal to lMod at step 718.

Figure 10B:
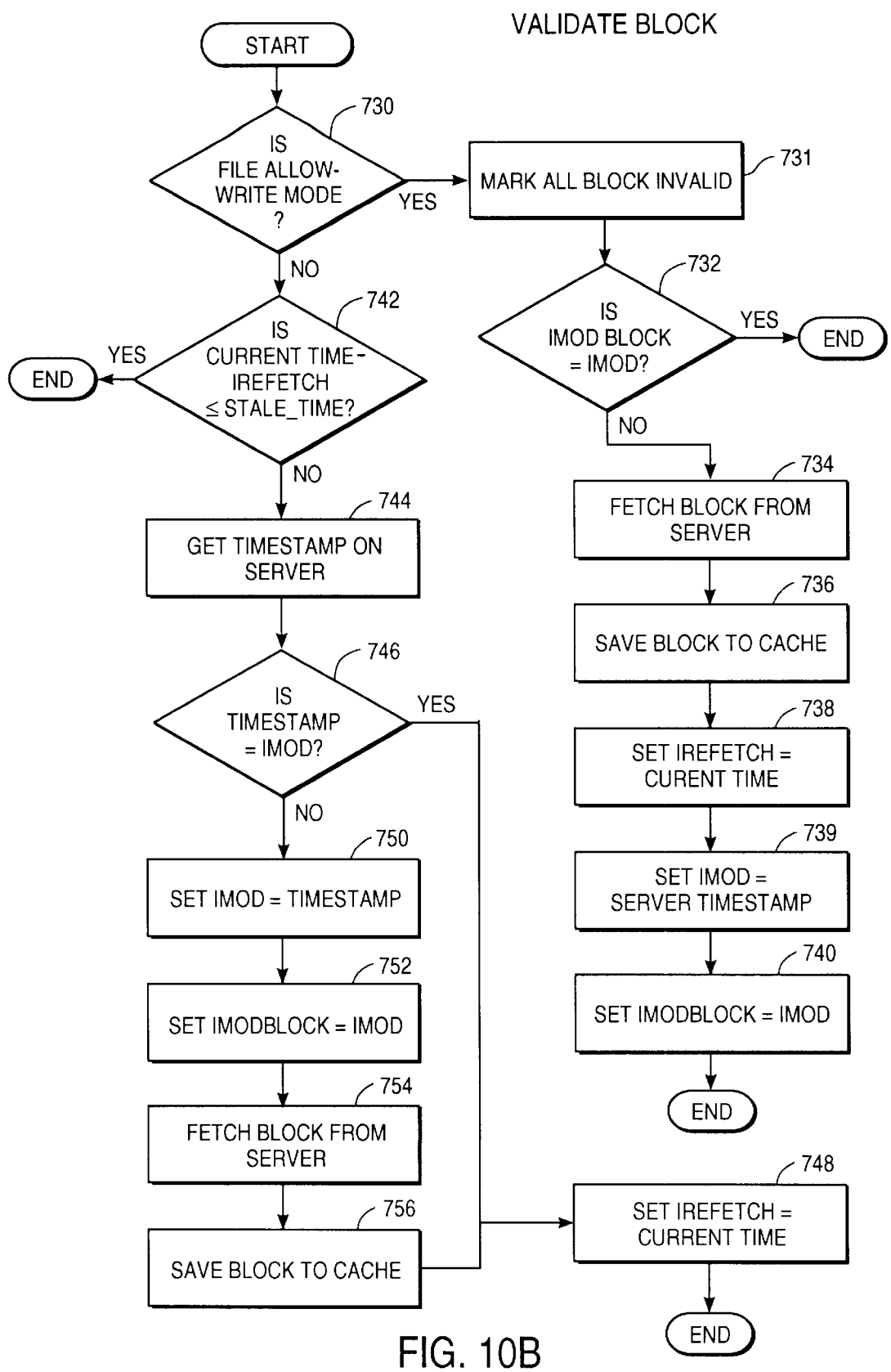
FIG. 10B illustrates a flowchart of validating a block of a cached file being read.

FIG. 10B illustrates a flowchart of validating a block of a cached file being read. At step 730, the file subsystem checks if the file was opened in allow-write mode. In allow-write mode, other computer systems in the distributed file system are allowed to write to the file.

If the file was opened in allow-write mode, the cache subsystem marks all the blocks in the cache for the file as invalid at step 731. The blocks Are marked invalid as the blocks may now be inconsistent with the blocks on the server. The variable lModBlock for the block is then compared to the variable lMod for the file at step 732. If lModBlock is not equal to lMod, the block needs to be fetched from the server because the file on the server has been modified since the block was last cached. Accordingly, the block is fetched from the server at step 734. After the block is fetched, the block is saved to the cache at step 736. Whenever a block is fetched from the server, the variable iRefetch is set to the current time as in step 738. At step 739, the cache subsystem sets the variable lMod to the server timestamp of the file. The variable lModBlock in the associated plain block of the FCI file is set equal to lMod at step 740.

If the file was opened in deny-write mode, meaning other computer systems are not allowed to write to the file, the cache subsystem determines if the difference between the current time and the variable lRefetch is less than or equal to a user defined variable Stale_Time. Stale_Time is a variable indicating how much time should pass before the data in a cached block is potentially stale. If the cached block is potentially stale, the timestamp for the file on the server is retrieved at step 744. At step 746, the timestamp is compared with lMod to determine if the cached block is actually stale. If the timestamp and lMod are equal, the cached block is not stale and lRefetch is set equal to the current time at step 748.

If the timestamp and lMod are not equal, the cached block is stale. First, lMod is set equal to the timestamp at step 750. At step 752, the variable lModBlock is set equal to lMod. The cache subsystem then fetches the block from the server at step 754. After the block is received by the cache subsystem, the block is saved to the cache at step 756. The variable lRefetch is set equal to the current time at step 748.

If the cached file was opened in append mode, the present invention provides a further optimization by treating the file as if it was opened in non-share mode even if it was opened in share mode.

Figure 11:
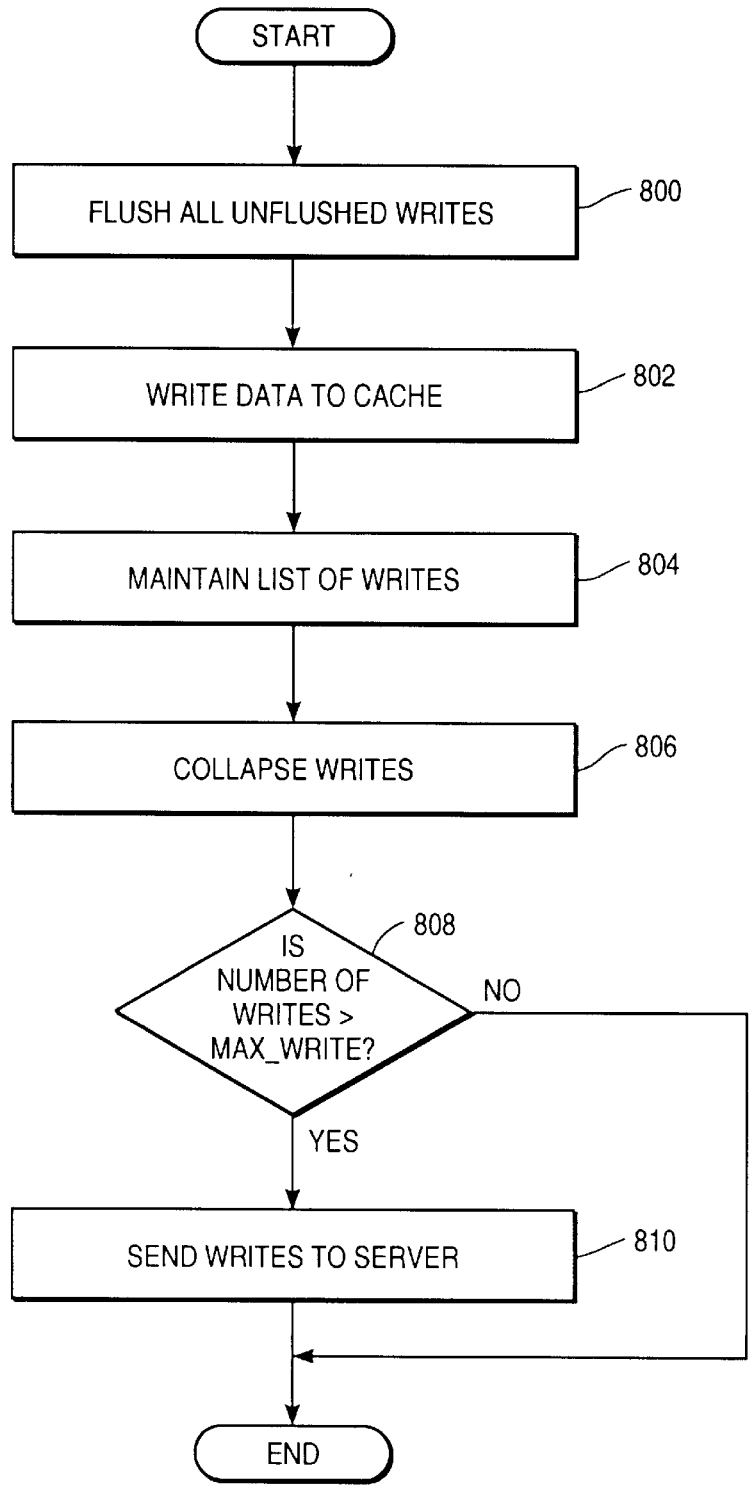
FIG. 11 illustrates a flowchart of a file system call that writes data to a block of a cached file.

FIG. 11 illustrates a flowchart of a file system call that writes data to a block of a cached file. At step 800, the cache subsystem flushes all unflushed writes to shared files. This is done to preserve the ordering of writes to shared files. The data is written to the cache at step 802. The cache subsystem maintains a list of writes at step 804. When data is written to the cache, the cache subsystem stores the exact byte(s) written to in a linked list entry for each write. The linked list entry contains the starting offset within the file and the length of the region written. If two writes are to contiguous regions of the file, the writes are collapsed into a single contiguous write at step 806.

Max_Write is a user defined variable that indicates how many writes may be stored in the linked list before they are written out to the file on the server. At step 808, the number of writes in the linked list is compared to Max_Write. If the number of writes in the linked list is greater than Max_Write, the cache subsystem writes the writes back to the server using the information stored in the linked list.

Figure 12:
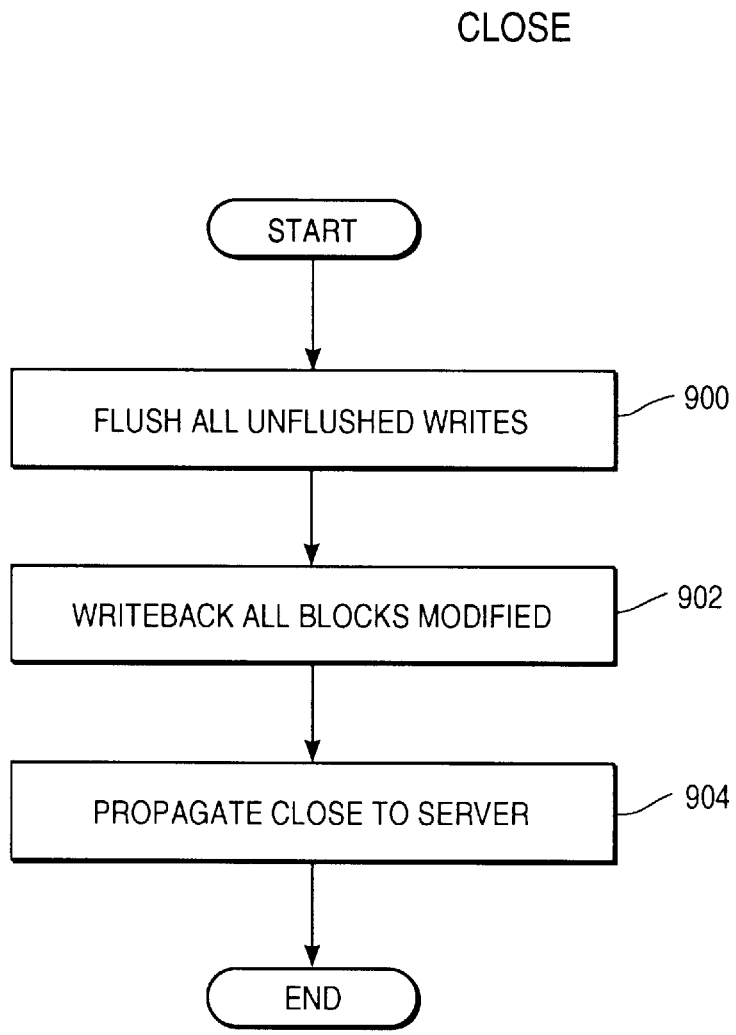
FIG. 12 illustrates a flowchart of a file system call that closes a cached file.

FIG. 12 illustrates a flowchart of a file system call that closes a cached file. At step 900, the cache subsystem flushes all unflushed writes to shared files. This is done to preserve the ordering of writes to shared files. The cache subsystem writes back all file blocks modified since the file was last opened at step 902. The cache subsystem then propagates the close request to the server at step 904.

Figure 13:
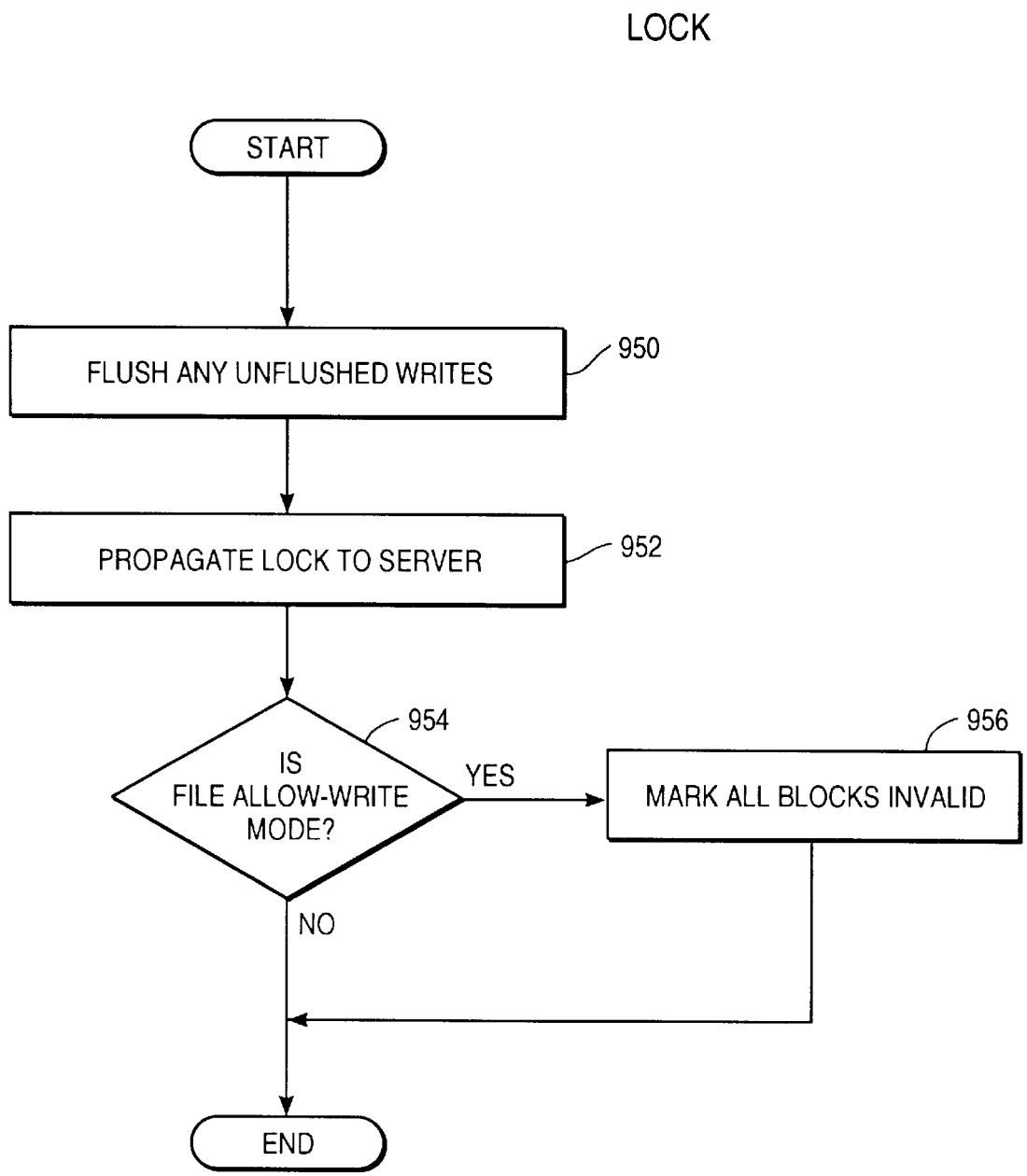
FIG. 13 illustrates a flowchart of a file system call that locks a cached block.

FIG. 13 illustrates a flowchart of a file system call that locks a cached block. At step 950, the cache subsystem flushes all unflushed writes to the block. The cache subsystem then propagates the lock request to the server at step 952. Preferably, the lock request specifies the region requested so that the entire block is not locked. At step 954, the cache subsystem determines if the file was opened in allow-write mode. If it was, the system marks all cached blocks for the file as invalid at step 956.

Figure 14:
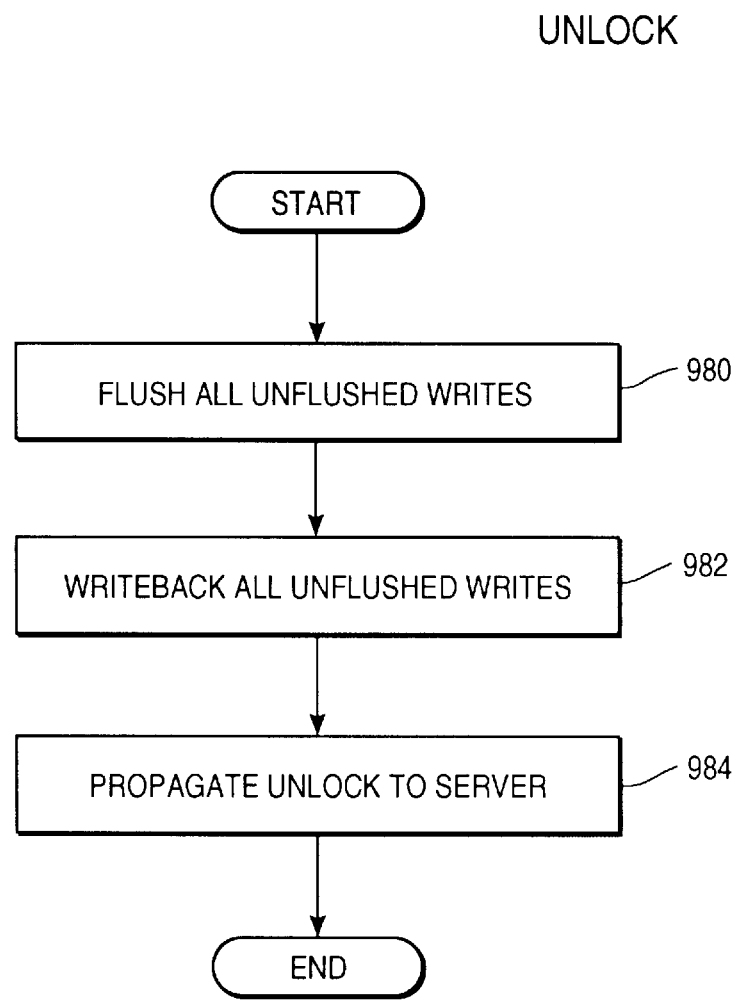
FIG. 14 illustrates a flowchart of a file system call that unlocks a cached block.

FIG. 14 illustrates a flowchart of a file system call that unlocks a cached block. At step 980, the cache subsystem flushes all unflushed writes to shared files. At step 982, all unflushed writes since the last lock to the server are written back. The cache subsystem then propagates the unlock request to the server at step 984.

In general, other file system calls are propagated on to the server since the other file system calls are generally infrequent. However, the description of specific file system calls is for illustration. Other file system calls may also be optimized.

The present invention may be implemented in many forms. In a simple form, the software is only installed on the client computer side. Once installed, file access is increased due to the file caching and data remains intact due to the cache coherency protocols. Additionally, components of the present invention may run on both the server and client sides of the distributed file system. Installation of software on the server side allows for increased performance because of more efficient use of the low bandwidth link and block validation techniques. In any event, the operation system does not have to be modified to achieve a substantial immediate performance increase for the distributed file system.

In one embodiment, the present invention is installed on the server side of the network. The software installed on the server side creates a proxy-server, meaning that it will act on the client's behalf. Take as an example the remote access shown in FIG. 5. Client computer 250 is required to send file and non-file system calls to the server over the relatively low bandwidth link. However, if the proxy-server of the present invention is installed on the server, the accelerator subsystem of the present invention on the client computer can make more efficient use of the low bandwidth link. The accelerator subsystem is able to utilize techniques like compression and differential compression because the proxy-server will receive the signals and then issue the file or non-system calls on behalf of the accelerator subsystem. This technique provides dramatically increased performance on the server because all system calls, both file and non-file system calls, are accelerated by a protocol that is considerably faster than standard TCP/IP or SPX/IPX. Although the proxy-server may be installed on the server, it may also be installed on any computer system on the network.

The proxy-server is also able to enhance the performance of validating blocks. Instead of following the procedure shown in FIG. 10B for validating blocks, the cache subsystem prepares a series of checksums for the subblocks of the block to be validated. The cache subsystem then sends the series of the checksums to the proxy-server. The proxy-server prepares a series of checks for the subblocks of the block on the server and compares the checksums. If the checksums are identical, the block in the cache is valid. Otherwise, the proxy-server indicates to the cache subsystem which subblock checksums do not match and sends the current version of these subblocks to the cache subsystem.

Installing the proxy-server of the present invention on the server side can also provide increased performance for non-file system calls. For example, the proxy-server may be used to validate SQL database operations. Assume that the user of the client computer has requested an SQL data operation that has already been performed and is currently in the cache on the client computer. However, the cache subsystem does not know if the database has changed since the last database operation was performed. The cache subsystem then generates a series of checksums for the results of the database operation in the cache and sends it to the proxyserver on the server side. The proxy-server then performs the database operation, generates a series of checksums for the results of the database operation, and compares the series of checksums. If the checksums indicate that the results are the same, the proxy-server is able to just send a signal to the cache subsystem on the client computer indicating that the results in the cache are still valid. Thus, the results of the database operation do not have to be sent over the network link again.

The invention has now been described in terms of a preferred embodiment. Modification and substitutions will now be apparent to persons of ordinary skill in the art. Accordingly, it is not intended that the invention be limited except as provided by the appended claims.

What is claimed is:

1. In a computer network providing a distributed file system, the computer network including a server computer and a client computer where files stored on the server computer are accessible by the client computer via a network link, a method of accelerating performance of the client computer comprising the steps of:
   an application operating on the client computer issuing a system call to retrieve data stored on the server computer;
   an accelerator subsystem on the client computer trapping the system call on the client computer before the system call is sent over the network link;
   the accelerator subsystem determining if the system call is capable of being serviced locally utilizing a cache on the client computer that stores data from the server computer, the accelerator subsystem being separate from an operating system of the client computer;
   validating the data in the cache on the client computer, wherein the validating step includes comparing a timestamp of the data to a timestamp of a file containing the data;
   servicing the system call on the client computer if the system call is serviceable locally; and
   sending the system call to the server computer if the system call is not serviceable locally.

2. The method of claim 1, wherein the sending step utilizes a highly optimized protocol for a low bandwidth network connection.

3. The method of claim 1, wherein the trapping step is performed with a DOS redirector interface.

4. The method of claim 1, wherein the system call is a file system call or non-file system call.

5. The method of claim 1, wherein the system call is a Structured Query Language (SQL) call or a network Application Programming Interface (API) call.

6. In a computer network providing a distributed file system, the computer network including a server computer and a client computer where files stored on the server computer are accessible by the client computer via a network link, a method of accelerating performance of the client computer comprising the steps of:
   an application operating on the client computer issuing a system call to retrieve data stored on the server computer;
   an accelerator subsystem on the client computer trapping the system call on the client computer before the system call is sent over the network link;
   the accelerator subsystem determining if the system call is capable of being serviced locally utilizing a cache on the client computer that stores data from the server computer, the accelerator subsystem being separate from an operating system of the client computer;
   validating the data in the cache on the client computer, wherein the validating step includes the steps of:
     generating a first checksum for the data in the cache on the client computer;
     sending the first checksum to the server computer over the network link;
     a proxy subsystem on the server computer generating a second checksum for corresponding data on the server computer, the proxy subsystem being separate from an operating system of the server computer; and
     comparing the first and second checksums;
   servicing the system call on the client computer if the system call is serviceable locally; and
   sending the system call to the server computer if the system call is not serviceable locally.

7. The method of claim 6, further comprising the step of sending a signal to the client computer indicating the data in the cache is valid if the first and second checksums are equal.

8. In a computer network providing a distributed file system, the computer network including a server computer and a client computer where files stored on the server computer are accessible by the client computer via a network link, a method of accelerating performance of the client computer comprising the steps of:
   an application operating on the client computer issuing a system call to retrieve data stored on the server computer;
   an accelerator subsystem on the client computer trapping the system call on the client computer before the system call is sent over the network link, wherein the trapping step comprises the step of setting a NETWORK bit of a Current Directory Structure (CDS) of a selected hard drive;
   the accelerator subsystem determining if the system call is capable of being serviced locally utilizing a cache on the client computer that stores data from the server computer, the accelerator subsystem being separate from an operating system of the client computer;
   servicing the system call on the client computer if the system call is serviceable locally; and
   sending the system call to the server computer if the system call is not serviceable locally.

9. The method of claim 8, wherein the sending step comprises the steps of:
   resetting the NETWORK bit of the CDS to an original state;
   setting a bit in a memory to indicate the accelerator subsystem should not trap a next system call; and
   issuing the system call, whereby the system call will be sent to the server computer over the network link.

10. In a computer network providing a distributed file system, the computer network including a server computer and a client computer where files stored on the server computer are accessible by the client computer via a network link, a method of providing caching on the client computer comprising the steps of:

installing a cache subsystem on the client computer, the cache subsystem being separate from an operating system of the client computer;

the cache subsystem maintaining a cache on the client computer for selected files stored on the server computer;

the cache subsystem trapping a file system call from an application operating on the client computer specifying a read operation of a selected file;

validating data in the cache, the step of validating comprising the steps of:

generating a first checksum for the data in the cache on the client computer;

sending the first checksum to the server computer over the network link;

a proxy subsystem on the server computer generating a second checksum for corresponding data on the server computer, the proxy subsystem being separate from an operating system of the server computer; and comparing the first and second checksums;

if the file system call requests data in the cache, accessing the data in the cache; and if the file system call requests data that is not in the cache, sending the file system call to the server computer over the network link.

11. The method of claim 10, further comprising the step of sending a signal to the client computer indicating the data in the cache is valid if the first and second checksums are equal.

12. A computer network system, comprising:

a client computer;

a server computer storing files accessible by the client computer;

a network link coupling the client computer to the server computer;

an operating system operating on the client and server computer that provides networking functionality;

a cache subsystem operating on the client computer separate from the operating system, the cache subsystem trapping system calls requesting data in selected files stored on the server and maintaining a cache of data in the selected files to satisfy the system calls locally on the client computer a first computer coupled to the network link; and a proxy subsystem operating on the first computer to receive messages from the client computer in order to generate system calls to the server computer;

wherein the network link between the client computer and the server computer is slow compared to the network link between the first computer and the server computer.

13. In a computer network providing a distributed file system, the computer network including a server computer and a client computer where files stored on the server computer are accessible by the client computer via a network link, a method of accelerating performance of the client computer comprising the steps of:

an application operating on the client computer issuing a system call to retrieve data stored on the server computer;

an accelerator subsystem on the client computer trapping the system call on the client computer before the system call is sent over the network link, wherein the trapping step comprises the step of setting a NETWORK bit of a Current Directory Structure (CDS) of a selected hard drive;

the accelerator subsystem determining if the system call is capable of being serviced locally utilizing a cache on the client computer that stores data from the server computer, the accelerator subsystem being seperate from an operating system of the client computer;

validating the data in the cache on the client computer;

servicing the system call on the client computer if the system call is servicable locally; and sending the system call to the server computer if the system call is not servicable locally.

14. In a computer network providing a distributed file system, the computer network including a server computer and a client computer where files stored on the server computer are accessible by the client computer via a network link, a method of accelerating performance of the client computer comprising the steps of:

an application operating on the client computer issuing a system call to retrieve data stored on the server computer;

an accelerator subsystem on the client computer trapping the system call on the client computer before the system call is sent over the network link;

the accelerator subsystem determining if the system call is capable of being serviced locally utilizing a cache on the client computer that stores data from the server computer, the accelerator subsystem being separate from an operating system of the client computer;

generating a first checksum for the data in the cache on the client computer;

sending the first checksum to the server computer over the network link;

a proxy subsystem generating a second checksum for corresponding data on the server computer, the proxy subsystem being separate from an operating system of the server computer;

comparing the first and second checksums to validate the data in the cache on the client computer;

servicing the system call on the client computer if the system call is serviceable locally; and sending the system call to the server computer if the system call is not serviceable locally.

15. A computer program product that accelerates performance of a client computer on a computer network with a server computer, comprising:

computer code that traps a system call from an application on the client computer for retrieving data stored on the server computer;

computer code that is separate from the operating system of the client computer determining if the system call is capable of being serviced locally utilizing a cache on the client computer that stores data from the server computer;

computer code that generates a checksum for the data in the cache on the client computer in order to validate the data in the cache;

computer code that services the system call on the client computer if the system call is serviceable locally; and computer code that sends the system call to the server computer if the system call is not serviceable locally.

* * * * *